United States Patent [19]

Vogen

[11] Patent Number: 4,674,591
[45] Date of Patent: Jun. 23, 1987

[54] METHOD AND APPARATUS FOR SEISMIC EXPLORATION

[75] Inventor: Wayne V. Vogen, Oakland, Calif.
[73] Assignee: URS Corporation, San Mateo, Calif.
[21] Appl. No.: 834,638
[22] Filed: Feb. 28, 1986
[51] Int. Cl.⁴ .............................................. G01V 1/00
[52] U.S. Cl. .................................. 181/108; 181/113; 181/121
[58] Field of Search ............... 181/101, 102, 106, 113, 181/121, 401; 367/25, 27, 189, 190, 911; 73/152

[56] References Cited

U.S. PATENT DOCUMENTS

| | | | |
|---|---|---|---|
| 2,745,507 | 5/1956 | Bodine, Jr. | 181/0.5 |
| 2,953,351 | 9/1960 | Bodine et al. | 181/0.5 |
| 3,216,525 | 11/1965 | Fail et al. | 91/459 |
| 3,282,371 | 11/1966 | Miller | 181/102 |
| 3,416,632 | 12/1968 | Bodine, Jr. | 181/0.5 |
| 3,504,756 | 4/1970 | Bodine | 181/0.5 |
| 4,049,077 | 9/1977 | Mifsud | 181/114 |
| 4,103,756 | 8/1978 | Trulio et al. | 181/106 |

Primary Examiner—Charles T. Jordan
Assistant Examiner—John W. Eldred
Attorney, Agent, or Firm—Owen, Wickersham & Erickson

[57] ABSTRACT

Method and apparatus for downhole seismic exploration employing vibration emanating from a point deep in a well. An elastic steel column has an upper end extending above the top of the well. A reaction mass is attached vertically thereabove through a vertically mounted compression spring system, in parallel with it a vertically mounted servo-controlled hydraulic cylinder-piston assembly. The displacement of a spear or bit on the lower end of the column relative to earth develops a displacement signal. The piston in the hydraulic cylinder is under reciprocated servo control to apply vertical vibration to the upper end of the column and thereby to the spear, while developing an electrical, pressure-differential signal corresponding to the pressure across the cylinder-piston assembly. The vertical vibration is adjusted by feedback through the servo control in accordance with the displacement signal and the pressure differential signal, to seek and find an appropriate resonant frequency for the column in the range of 5 Hz to 250 Hz. The frequency is maintained at resonance to generate and transmit a downhole signal, which is detected at a location at a known distance from the spear so that the time differential between transmission and detection of the signal.

22 Claims, 12 Drawing Figures

— — — TRANSMISSION PATHS

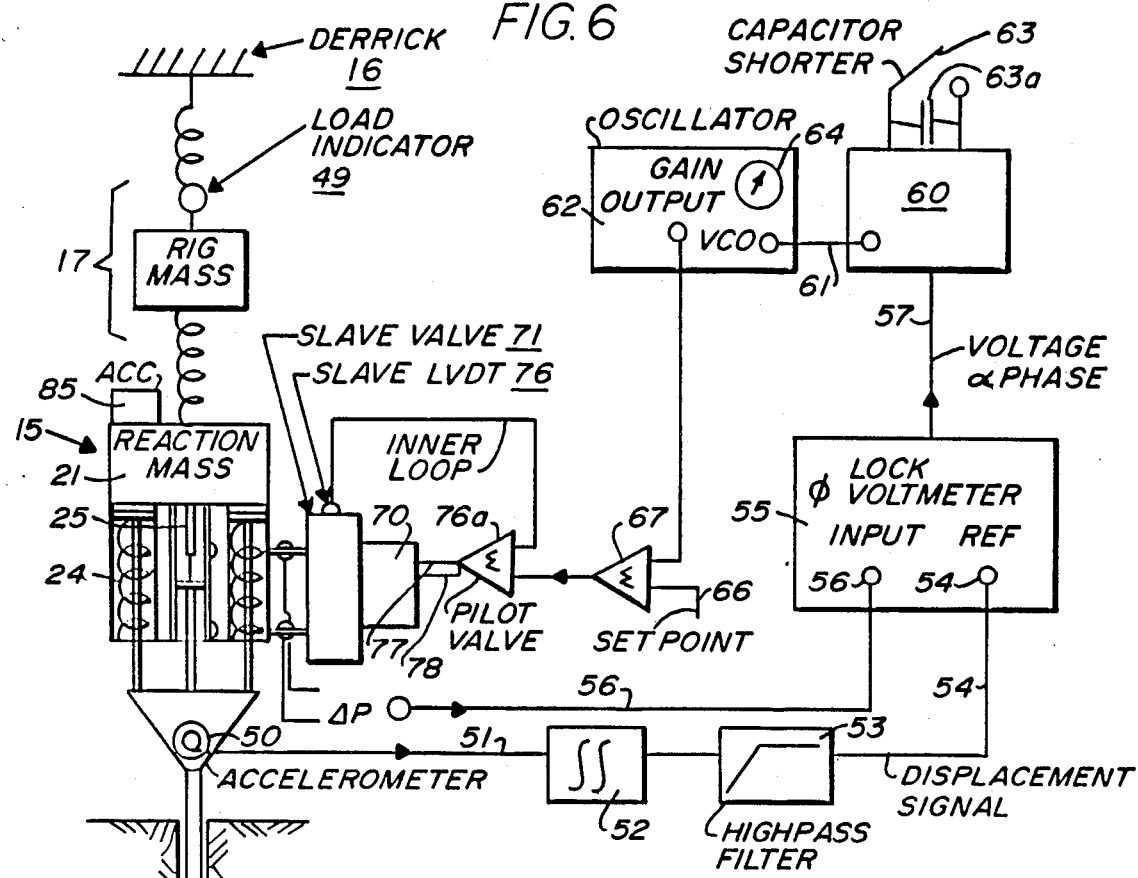
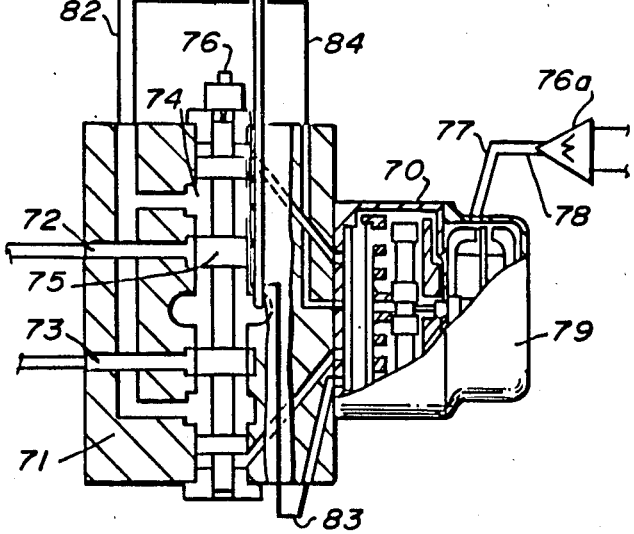
FIG. 6
FIG. 7

| a | b | c |
| INPUT | IMPEDANCE OF DRILL PIPE | OUTPUT (CONSTANT AMPLITUDE VS. FREQUENCY) |

METHOD AND APPARATUS FOR SEISMIC EXPLORATION

This invention relates to method and apparatus for down-hole seismic exploration and mapping.

BACKGROUND OF THE INVENTION

The most popular method of locating new oil deposits utilizes reflection and/or refraction seismic exploration. The method usually employs a vibration source on the surface of the ground which imparts seismic waves into the ground. These waves either reflect or refract from boundaries which have a change in the seismic impedance. (Seismic impedance is the velocity of sound times the density of the media.) The returning sound waves are detected by seismometers deployed on the surface of the ground. Through a complicated analysis process, the sound velocity and structure of the ground is determined. Physical properties of earth, such as its composition, can then be deduced from the velocity of sound.

This method is very popular and effective but suffers from definite, known problems:

First, this prior-art method makes it quite expensive to produce data with fine resolution.

Second, the process depends on surfaces which reflect or refract the sound waves, in order to return the signals so that they can be detected. This condition is absent in approximately one-third of the world.

Third, the top of the ground is highly weathered, and the weathering strongly attenuates the source waves and the returning waves. The effect is that the data deteriorate, due to the reduction in signal-to-noise ratio.

Fourth, most noise is generated at the surface by wind or machinery, and it is attenuated with depth. Broadcasting and receiving seismic signals below the ground's surface benefits from lower ambient noise levels.

A method which overcomes these problems involves locating the vibration source down a well and positioning geophones both on the surface of the ground and down into adjacent wells.

The down hole seismic exploration method is primarily a transmission technique, in contrast to surface methods which are based on reflection and/or refraction of seismic waves. In down-hole exploration, the waves are simply transmitted from the source (spear) to the detector (geophones). The velocity is deduced from the travel time between the transmitter and receiver, for the velocity of the sound is simply the distance traveled divided by the travel time. Geological features which do not possess a change in acoustic impedance can be defined by transmission seismic techniques because reflection or refraction techniques are not required. Indeed, most oil fields have been mapped with surface seismic techniques, and such surface techniques may have missed oil-bearing regions or changes in geologic structure which could block the flow of oil to a well. The primary use for the down-hole seismic method is in refining the definition of existing oil fields in order to assist in the placement of new wells for recovering untapped oil reserves which are in close proximity to existing wells.

SUMMARY OF THE INVENTION

The invention has both method and apparatus aspects. The method typically begins by providing a wide bore free from tubing, sucker rods, pumps and so on. A tubing string, usually drill pipe is run into the well bore, with a casing spear attached to the bottom of the string. An accelerometer is usually attached to the spear. The string provides an elastic steel column; the upper end of which column extends to and above the top of the well. To this upper end of the column is attached a reaction mass lying vertically thereabove, the attachment being made through a vertically mounted servo-controlled hydraulic cylinder-piston assembly.

The piston of the hydraulic cylinder is then reciprocated up and down under servo control to apply vertical vibration to the upper end of the column. This vibration is transmitted down to the spear. It is continually adjusted through the servo control to an appropriate resonant frequency for the column, in the range of 5 Hz to 250 Hz, the resonance being maintained by the application of electrical feedback from the accelerometer (which is usually attached to the spear but may, in some instances, be rigidly connected to the top of the column. A displacement signal is produced by double integration of a signal from the accelerometer. Detectors below ground in other wells detect the seismic signal emitted from the spear and record the physical contrasts there. These are later interpreted.

The apparatus thus includes a reaction mass, vertically mounted compression springs, and, in parallel with the springs, a vertically mounted hydraulic cylinder-piston assembly which connects the reaction mass to the column.

The servo-control system for the hydraulic cylinder-piston assembly simultaneously reciprocates the piston to apply vertical vibration to the upper end of the column, and feedback apparatus continually adjusts the servo-control to cause the assembly to seek and maintain an appropriate resonant frequency for the column, in the range of 5 Hz to 250 Hz.

The invention provides means for keeping exactly on resonance, thereby producing the maximum response at the spear for a given amount of power. This is important, because any other system would have to be larger than that of present invention in order to be as effective, and the unit of the invention occupies a large truck and employs a rather large engine. Moreover, using a servo hydraulic actuator provides infinitely variable controllability.

In other wells, geophones or other detectors receive and record the detected signal, from which the results are later on simultaneously interpreted.

Employing the apparatus of this invention as the vibration source in down-hole seismic exploration yields significant advantages.

First, the invention, operating with the feedback servo hydraulic actuator, provides for faithful output of any desired seismic signal. This is important because many input sources are limited to certain types of seismic waves such as impulses or single frequency signals.

Second, the apparatus can apply large forces, because the power head is above ground, unlike many sources which have the prime mover down in the hole. The size of the well bore limits the output force very severely. The larger forces provided by the present invention produce higher signal-to-noise ratios, which yield better data and allow a larger area to be surveyed.

Third, the apparatus' reaction mass is above the well head. Prior-art down-hole sources had their reaction masses down hole, and these masses set up deleterious seismic waves in the well casing.

BRIEF DESCRIPTION OF THE DRAWINGS

FIG. 6 is a block diagram of the servo-control and feedback system utilized to seek and maintain resonance at the spear.

FIG. 7 is an enlarged diagrammatic view of a portion of FIG. 6 representing a slave system and related members.

FIG. 8a is an enlarged section taken along the line a—a in FIG. 8.

DESCRIPTION OF A PREFERRED EMBODIMENT

Figure 1:
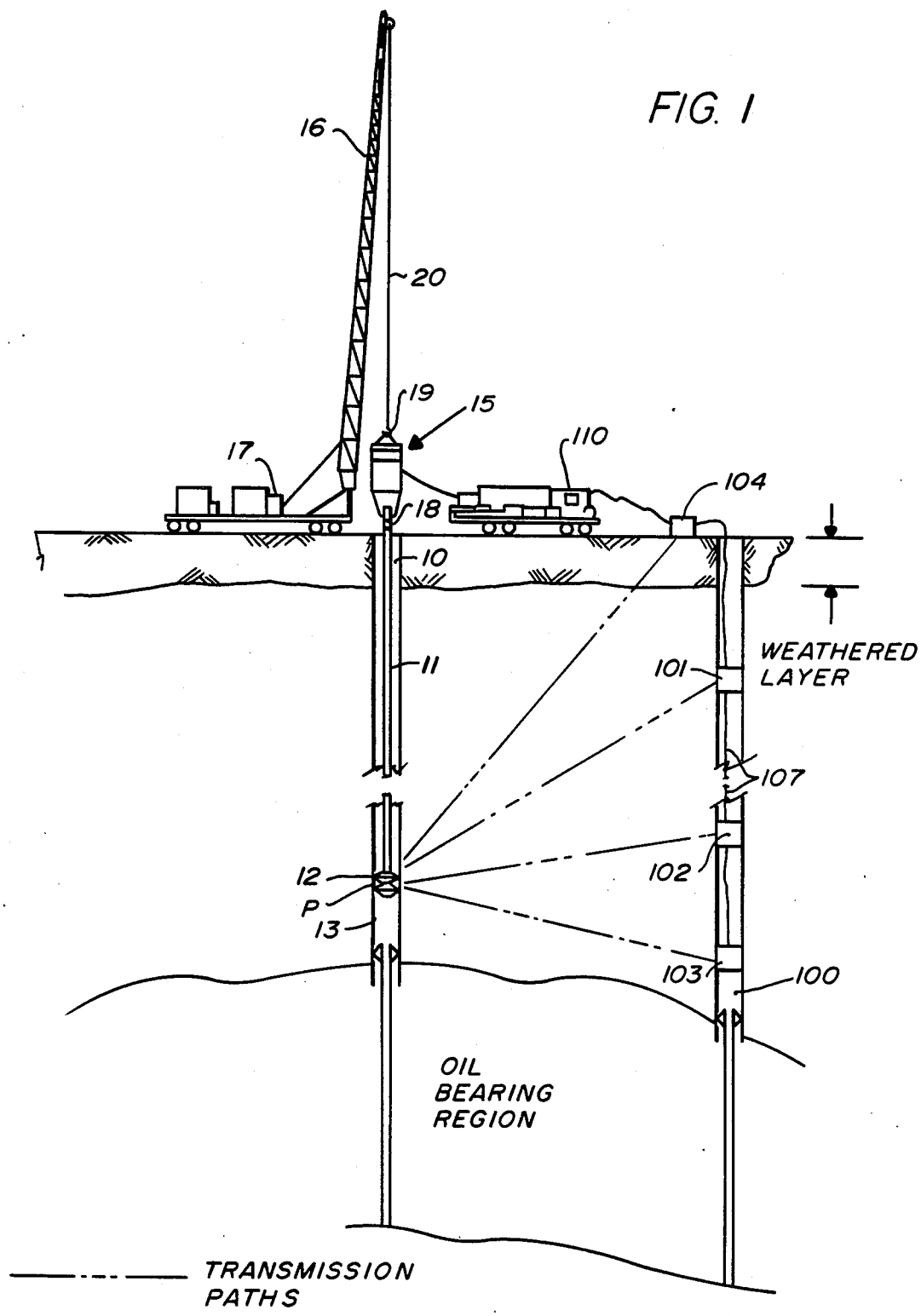
FIG. 1 is a simplified view in elevation and in section of apparatus embodying the principles of this invention.

The procedure preferably employed to utilize the apparatus as a down-hole seismic source involves, first, removing any material that may be present in a selected well bore 10, such as tubing, sucker rods, pumps, etc. Then a tubing string 11, typically composed of drill pipe, is run into the well bore 10 with a casing spear 12 attached to the bottom of the string 11 conventional spear may be used. The spear 12 is engaged i.e., in contact with in a well casing 13 at a point P, where it is desired for the signal to radiate from. Vibration apparatus 15 is then hung from a derrick 16 of a workover rig 17 and connected at a connection 18 to the top of the drill string 11. The vibrating apparatus 15 then sets the top of the drill string 11 into vertical motion involving axial, tensional, and compressional deflections.

The vibration apparatus 15 may be connected to the workover rig 17 by including a shackle or block or hook 19 suspended on a cable 20.

Figure 3:
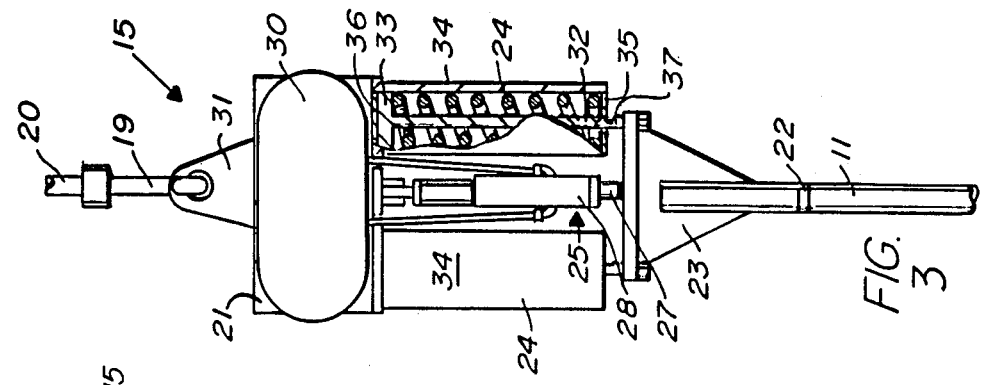
FIG. 3 is a fragmentary enlarged view in front elevation of the vibratory apparatus used in FIGS. 1 and 2 to connect the top of the drill string to a reaction mass.
Figure 4:
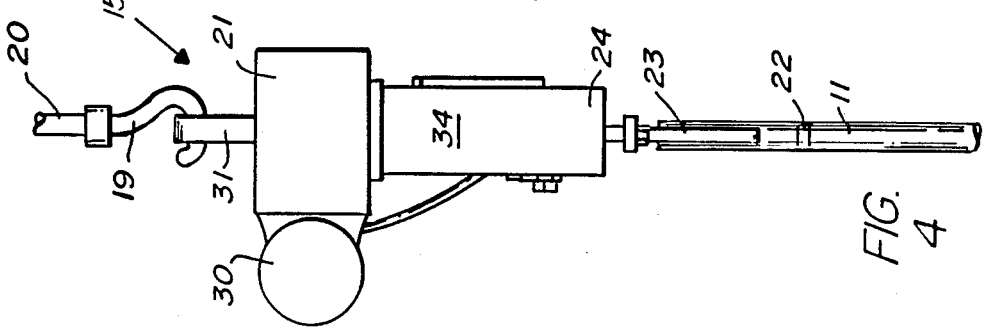
FIG. 4 is a view in side elevation of the assembly of FIG. 3.

The shaker system 15, shown in more detail in FIGS. 3 and 4, includes a reaction mass 21 held by the hook 19 (or a conventional shackle).

The upper end of the drill string 11 may be connected, as by a fitting 22, threaded or clamped to engage the threads at the upper end of the drill string 11, to a junction plate 23. A set of compression springs 24 form a connection between the junction plate 23 and the reaction mass 21, in parallel with a hydraulic cylinder-piston assembly 25. In the assembly 25 the piston (not shown) may be connected by a piston rod 27 (FIG. 3) to the junction plate 23, while the cylinder 28 is connected to the reaction mass 21.

An accumulator 30 is secured to and becomes part of the reaction mass 21, providing additional mass. The main reaction mass 21 may be a thick steel box filled with lead bricks and having a lifting eye 31 for attachment to the hook 19. The reaction mass 21 thus provides a nearly rigid structure for the hydraulic assembly 25 to work against. In addition, it greatly attenuates the motion imparted to the drill pipe 11 so as effectively to isolate the well derrick 16 from the large movements provided by the hydraulic cylinder-piston assembly 25.

The springs 24 are connected in parallel with the hydraulic assembly 25 to support the static load of the weight of the drill string 11 and the pull exerted by the derrick 16 through the lifting block 19. The springs 24 are preferably flat-end compression springs, each of which has a rod 32 through its center terminating at a bearing plate 33, so that the springs 24 behave like extension springs. The spring 24, rod 32, and bearing 33 are contained in a steel tube 34 with a lower end 35 against which the spring 24 bears, and the upper end 36 of the tube 34 is connected to the bottom of the reaction mass 21. The rod 32 extends out through an opening provided with a bearing 37 in the lower end 35 of the tube 34 and is connected to the junction plate 23.

The springs 24 are sized with respect to length and stiffness so as to be at or near mid-deflection under the range of the static loads to be encountered. The static load is generally the combination of the weight of the drill pipe 11 in the hole and the pull exerted by the rig 17 on the shaker system 15. The upward pull exerted by the workover rig 17 assures that the elastic pipe column 11 will always be in tension, thereby preventing Euler buckling of the drill string 11.

Figure 5:
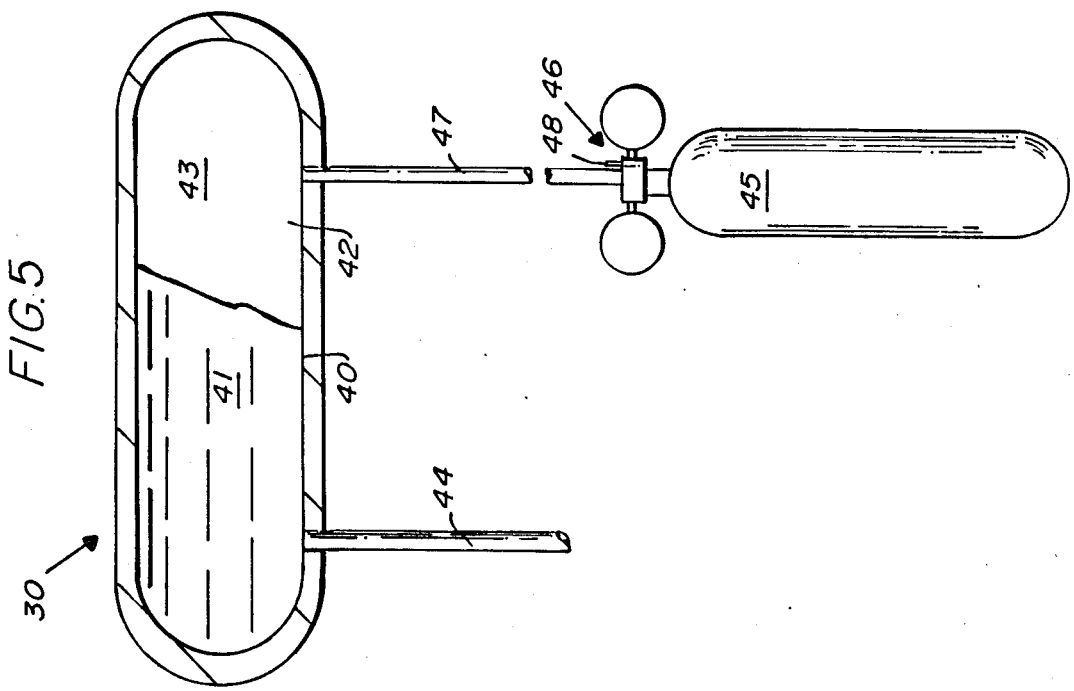
FIG. 5 is a view in elevation and partly in section of the accumulator of FIGS. 3 and 4 and its related parts, through which sharp pulses and high level transient boosts in output power may be applied to the drill string of FIG. 4.

During the set-up period, a hydraulic pump 80 (FIG. 7) is operated to store pressurized hydraulic fluid in the accumulator 30 at about 3000 p.s.i. The hydraulic accumulator 30 is a pressure vessel which contains a piston or inner expandable container 40 for hydraulic fluid 41 and an outer container or bladder 42 filled with nitrogen gas. As shown in FIG. 5, the accumulator 30 has a conduit 44 leading from the bag 40 to the hydraulic cylinder 28. The bladder 42 is supplied with nitrogen gas 43, when desired, by a high-pressure (e.g. 5,000 p.s.i.) nitrogen supply cylinder 45, via a regulator 46 and a conduit 47. A bleed valve 48 is provided to relieve the pressure in the bladder 42 as desired.

The accumulator 30 serves two main purposes. First, it reduces the pressure drop caused by the flexibility of the supply hose 44, which leads from the hydraulic pump 80 to the hydraulic cylinder 28. Second, it provides an energy storage medium in which high-pressure hydraulic fluid 41 can be accumulated (hence its name) before the commencement of excitation of the drill pipe 11.

An important feature of this invention is that the drill pipe 11 is driven at resonance by the servo-hydraulic system 25, operated in a feedback control mode. This is the most practical and economic method known to the inventor for accomplishing the needed resonant drive. Feedback control guarantees that the system is always driven exactly at resonance, thereby producing the maximum force.

Servo-controlled hydraulic cylinders are used in large numbers in numerous industries, unrelated to the present field, so that low cost, high reliability, and accuracy are readily obtainable. Therefore, the present system can be less expensive and more reliable and accurate than other possible methods of exciting the pipe 11 connected to the liner 13. Servo-controlled hydraulic cylinders are primarily used in a resonant configuration for materials testing, where the benefit of resonance decreases the power and size of the actuator required to achieve a large number of stress cycles in the object under test. They have not been used heretofore in a system like that of this invention.

Because the frequency of excitation of a servo-hydraulic system is locked to the resonant frequency of the pipe, changes in the amount of applied power changes only the force at the bound position.

FIG. 6 shows, somewhat diagrammatically, a controller or control system that may be employed to maintain the elastic pipe 11 and the spear 12 in longitudinal resonance. An accelerometer 50 may be attached to the top of the elastic column 11 to measure the acceleration as referenced to ground, rather than to the reaction mass 21. The acceleration signal 51 from the accelerometer 50 is subsequently double-integrated electrically by a double integrator 52 and then filtered with a five-pole high-pass filter 53 to attenuate low frequency 1-by-f noise. The five-pole filter rolloff characteristic is down 5 db at 5 Hz. The resulting displacement signal 54 is very regular and is free from low-frequency noise. Other means of obtaining such a displacement signal which relates to the acceleration of the reaction mass 21 relative to the earth in which the well 10 is located, may be used, if desired.

The displacement signal 54 is used as the reference in a phaselock voltmeter 55 which detects the relative phase between a signal indicating pressure differential, $\Delta P$, across the hydraulic cylinder-piston assembly 25, put into the voltmeter 55 as a signal 56 and the displacement signal 54. The $\Delta P$ signal 56 is a relatively pure sine wave during operation, but various factors such as the limited hydraulic supply pressure and pressure spikes distort the $\Delta P$ signal 56. At resonance, the displacement signal 54 and the $\Delta P$ signal 55 are 90° out of phase. The phaselock voltmeter 55 puts out a voltage 57 proportional to the relative phase between the displacement signal 54 and the $\Delta P$ signal 56. The voltage 57 is zero when the relative phase is 90°. The voltage 57 increases when the phase becomes greater than 90° and decreases when the phase is less than 90°. The phaselock voltmeter 55 has the ability to extract the sine wave component at the operating resonant frequency of the displacement and $\Delta P$ signals.

The voltage 57 is then sent to an integrator 60 and is electrically integrated. The output 61 of the integrator 60 is used as the voltage-controlled oscillator (VCO) drive of a sine wave generator 62. The dc voltage output 61 of the integrator 60 changes the frequency of the sine wave generator 62 to maintain resonance.

The integrator 60 may be an operational amplifier with a capacitor feedback loop, and in this invention a switch 63 is placed across a capacitor 63a of the integrator 60, so that the capacitor 63a can be shorted, thereby causing the output of the integrator 60 to be set to zero, as when setting the frequency of the oscillator 62 at the calculated resonant frequency for the drill string. A gain knob 64 of the oscillator 62 is used to control the amplitude of vibration of the elastic column 11 plus the spear 12. Turning up the gain proportionally increases the sine wave output signal 65 of the oscillator 62. This signal 65 is added to a d.c. voltage 66 at a voltage summing device 67. The voltage 66 is called the set point and controls the neutral position of a pilot servo valve 70. The pilot valve 70 may have a spool which is maintained approximately in its central position in order to keep the pressure wave across the hydraulic cylinder 28 symmetrical.

FIG. 7 shows a slave valve 71 connected by ports 72 and 73 to the piston-cylinder assembly 25, these ports leading into a valve passage 74 in which a spool 75 moves, as determined by a slave LVDT 76. An adder or summing device 76a is connected to the summing device 67 and adds the signal from the valve 71 to that of the device 67. The output of the adder 76a is sent by lines 77 and 78 to control a motor 79 which operates the pilot valve 70.

There is a hydraulic power supply or pump 80 to supply fluid to the slave valve 71 via a conduit 81 and to receive fluid via a conduit 82. A pilot pressure conduit 83 is connected to the conduit 81, and a pilot return conduit 84 is connected to the conduit 82.

The neutral operating position in the system is controlled by the rig operator and is maintained by keeping the tension constant by either raising or lowering the lifting block of the rig 17. The constant tension keeps the sprigng 24, which are parallel with the hydraulic cylinder 28, at a constant neutral position. The control system of FIG. 6 maintains the frequency precisely at resonance and the phase at 90°±1°.

The vibration produced by the apparatus 15 is transferred down the drill string 11 to the spear 12. The spear 12 then moves the casing 13 locally, causing vibrational energy to radiate from the casing 13 at the point P, which is also the location of the spear 12.

Figure 8:
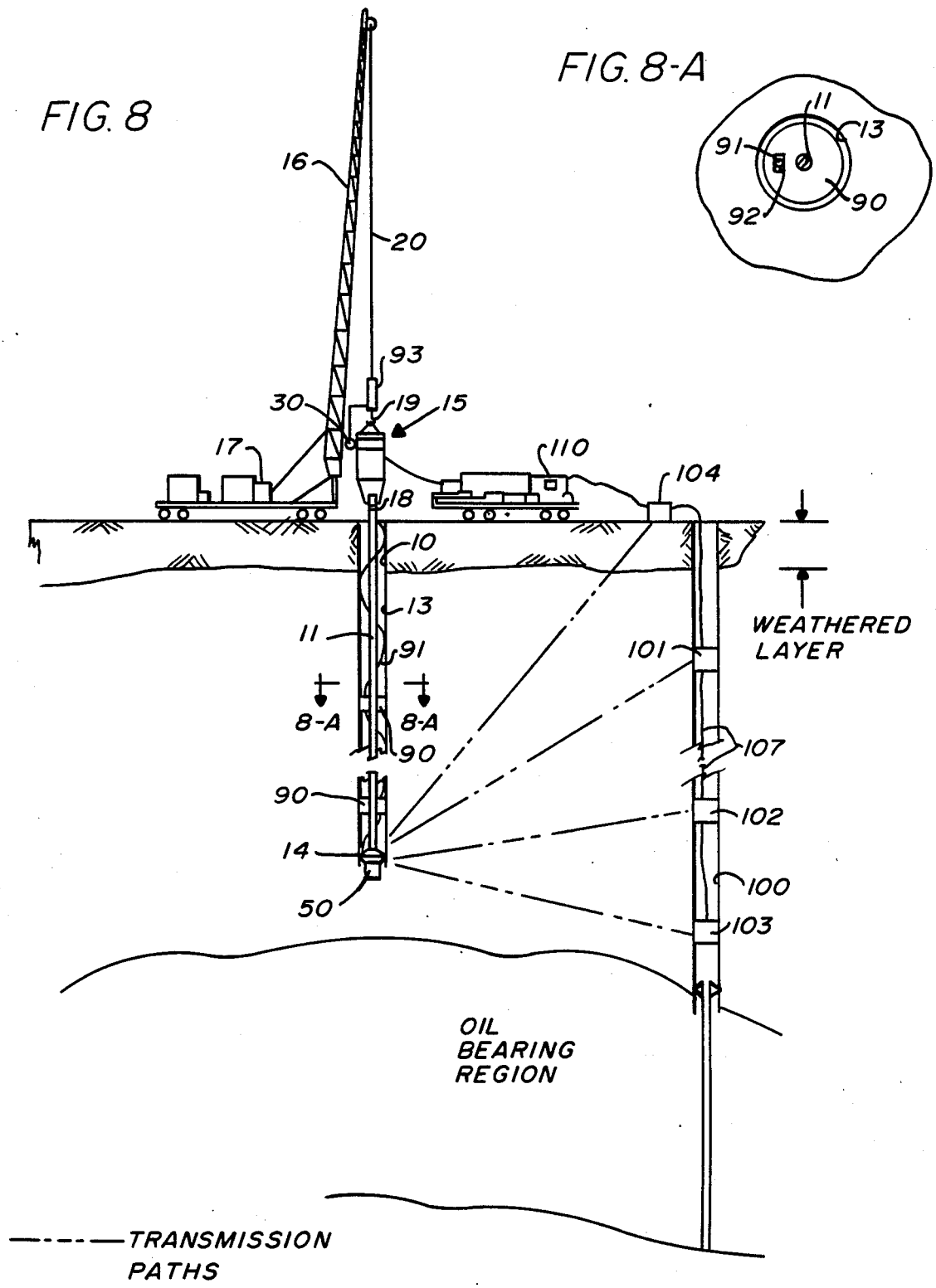
FIG. 8 is a view like FIG. 1 of a modified system embodying the principles of the invention, wherein a well being drilled is used from time to time as a vibration source.

An alternate method of employing the apparatus as a seismic source in an existing well, shown in FIG. 8, involves exciting the drill string 11 at intervals during the drilling procedure. As an example, the drill string 11 may be excited every time the drilling is halted to attach a new joint of drill pipe. The advantage of measuring during drilling is realized, because the drill rig and drill pipe are already available, and the only additional cost is that involved in employing the vibration apparatus 15. The technique differs slightly from the previous example because a casing spear 12 is not employed. Instead, a bit 14 is used to transfer the energy from the drill string 11 to the ground. The major consideration would be that the upward dynamic or cyclic force would always be less than the downward static force or weight on the bit 14. This assures that the bit 14 remains in contact with the drill face and couples the vibrational energy into the ground. Any type of input signal may be employed including a constant displacement swept sine (chirp), a series of single frequency sine signals, or a band-limited impulse.

Figure 11:
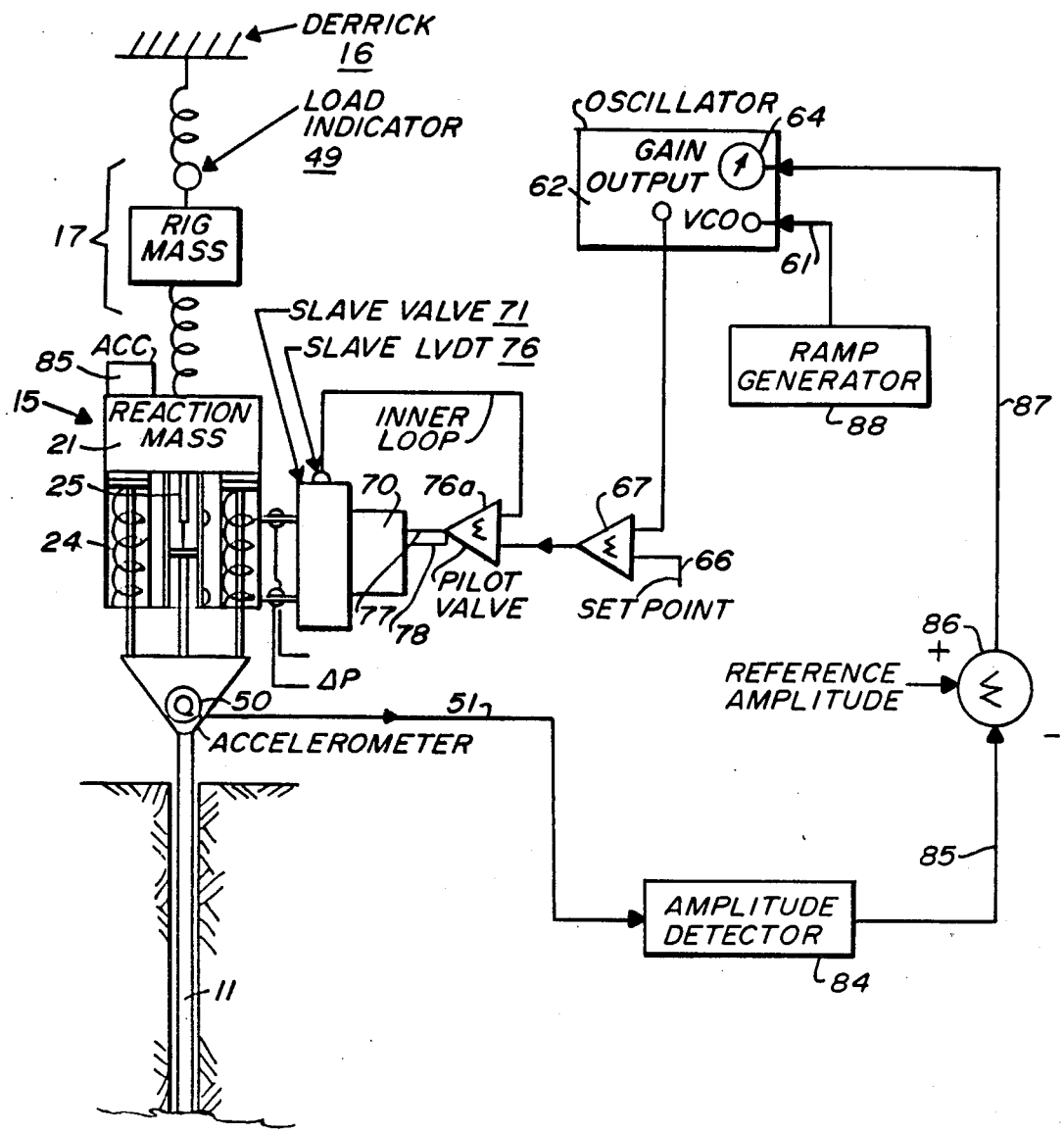
FIG. 11 is a block diagram similar to FIG. 6 of a modified form of the invention.

FIG. 11 shows a modified form of the invention, most parts of which correspond to FIG. 6. Here, however, the acceleration signal 51 from the accelerometer 50 goes to an amplitude detector 84. The amplitude 85 determined by the detector 24 is compared with a reference amplitude at a summer 86, and a signal 87 sent to the oscillator 62, which also receives a signal from a ramp generator 88. The ramp generator provides a chirp, a swept-frequency type of signal which typically starts at about 20 hertz and increases to about 250 hertz. This sweep determines the frequency of the sine wave emanating from the oscillator 62 and delivered to the voltage summing device 67. The velocity amplitude of that signal is held constant by the summer 86, which delivers its constant amplitude signal 87 to the oscillator 62. If the detected amplitude is less than the reference amplitude from the detector 84, the difference is added to the detected amplitude at the summer 86; if the detected amplitude is greater than the reference amplitude, the difference is subtracted from the detected amplitude at the summer 86.

Figure 9:
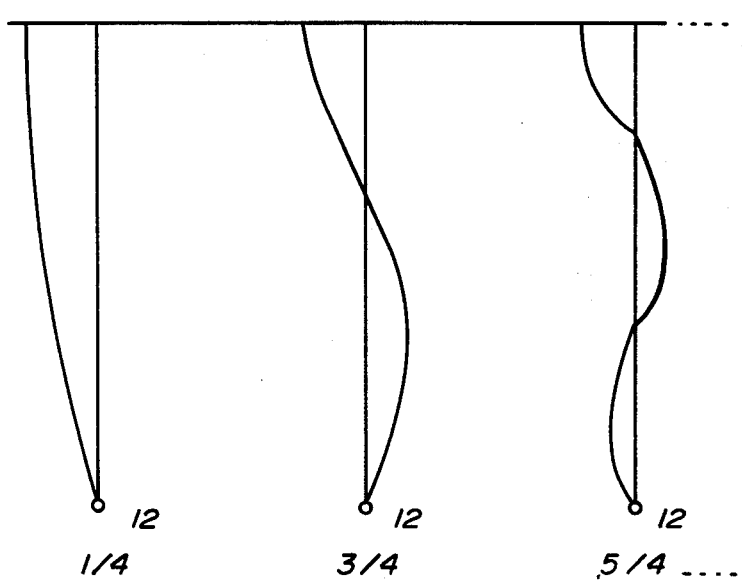
FIG. 9 is a diagram of three mode shapes obtained in the invention.

The drill string 11 exhibits an acoustical impedance characterized by resonances whose frequencies are related by the series of odd numbers divided by four (1/4, 3/4/5/4 ... ). The mode shapes are those of a free top end and a fixed bottom end, with each succeeding mode having an additional half cycle added. The first three mode shapes are depicted in FIG. 9. The frequencies of the mode shapes increase by the addition of $\frac{1}{2}$ to the fundamental frequency for each $\frac{1}{2}$ additional cycle. The equation for the frequencies of the mode shapes is then;

$$\text{Frequency} = (16848/L) \times (2n-1)/4 \quad n = 1, 2 \ldots x$$

where 16848 (feet/second) is the speed of sound in the drill pipe and L (in feet) is the length of the drill pipe 11. This impedance has the effect of altering the wave form input at the top of the drill string 11. When an impulse is used as the wave form, the change in signal at the spear 12 caused by the resonances of the drill pipe 11 can be ignored or accounted for.

The drill string 11 may have rubber protectors 90 installed to prevent lateral modes of vibration. The pipe protectors 90 also serve as guides for the accelerometer cable 91. If lateral modes of vibration were excited, the drill pipe 11 would strike the casing 13 horizontally and produce interfering seismic waves. When it is desired to excite the drill pipe 11 without the pipe protectors 90, the input signal is a series of single frequency sine waves chosen to avoid the frequencies of the lateral modes of vibration.

In many applications it is desirable to measure and control the wave form of the acoustic signal being input at the position of the spear 12. This is accomplished by installing the motion sensor, such as the accelerometer 50, either on the spear 12 (FIG. 8) or on the top of the drill string 11 (FIG. 6). The signal from the accelerometer 50 is then used as the control variable in the feedback control loop, shown in FIGS. 6 and 7. If the accelerometer 50 is in the spear 12, a cable 91 leads from the accelerometer 50 to ground level.

Figure 10:
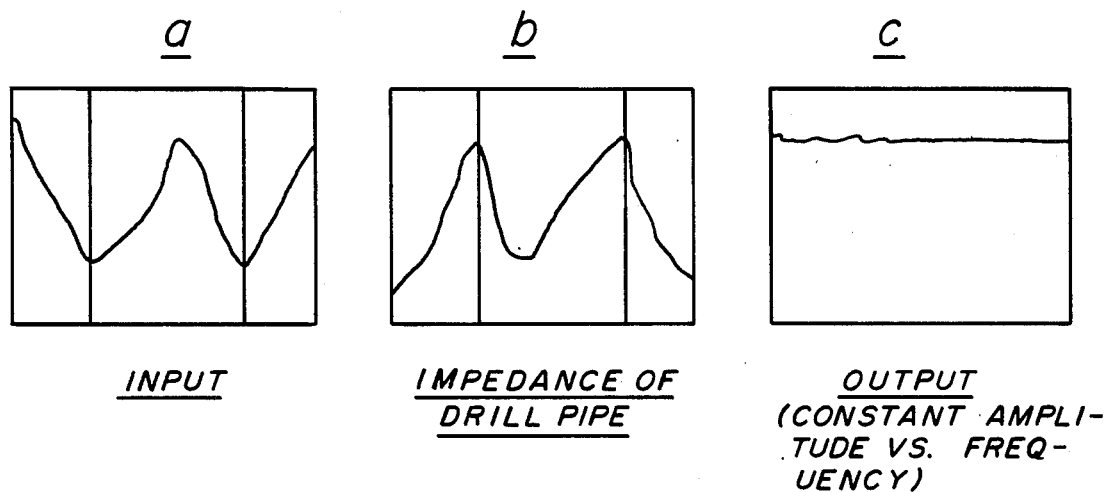
FIG. 10 is a set of three related graphs of frequency against time for the input, the impedance of the drill pipe, and the output.

If the desired output signal is a constant amplitude swept sine wave (chirp), the control loop will command the vibration apparatus to decrease the amplitude of motion of the top of the drill pipe 11 around the resonant peaks and increase the motion in the valleys away from the resonant peaks (See FIG. 10, element a). The result of the action of the control loop is to cancel the effect of the acoustic impedance of the drill string 11 (FIG. 10 at element (b) and allow any desired output signal to be produced at the spear, normally a constant amplitude signal (FIG. 10 at element c). The input signal (FIG. 10 at a) is effectively multiplied by the drill pipe dynamics (FIG. 10 at b) to produce the desired output (FIG. 10 at c) so that any desired output signal can be produced at the spear 12. In each instance, freq i means initial frequency and freq f means other frequencies, while $f \times \frac{1}{4}$ means initial frequency times $\frac{1}{4}$ and $f \times \frac{3}{4}$ means initial frequency times $\frac{3}{4}$.

Down-hole seismic surveys benefit from multiple input locations in the same manner as surface seismic surveys. The input location may be changed in a simple manner by disengaging the spear 12 from the casing 13 and either lowering or raising the spear 12 and reengaging it. Changing the location of the spear 12 can be accomplished as many times as required in the survey. If the bit 14 is used at intervals during drilling (FIG. 8), multiple source locations are accomplished by exciting the drill string 11 at different depth intervals.

Figure 2:
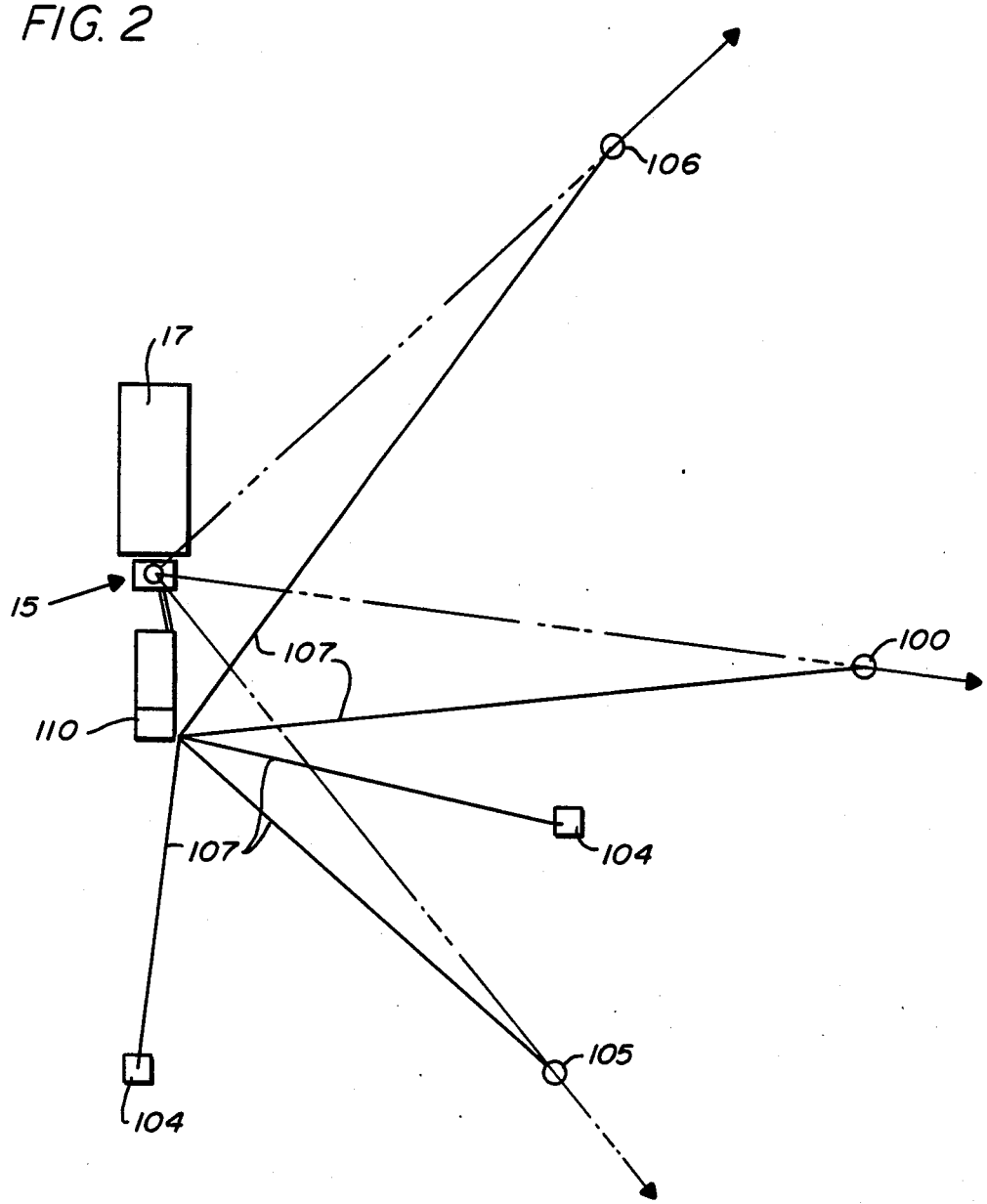
FIG. 2 is a simplified plan view of a system like that of FIG. 1.

The received signals are commonly measured by velocity sensors called geophones; installed either or both in wells at various levels or on the surface. FIG. 1 shows a sensing well 100 with three vibration sensors 101, 102 and 103 therein. There is also a vibration sensor 104 at the surface. FIG. 2 shows there are usually several sensing wells 100, 105, 106, etc., each with sensors, and several surface sensors 104. Each sensor 101, 102, 103 is connected to ground level by a signal line 107 and has an accompanying recorder, as does the vibration apparatus 15 itself; as at 110.

The travel time from the transmitter 12 to the receiver 101, 102, 103, 104 etc. is the desired information. The travel time can be deduced in many ways. The most popular way is to compare the transmitted and received signal by computing the cross correlation function. This calculation yields the delay time between the time of transmission and the time of the received signal. From the travel time (delay time) and the distance between the transmitter and receiver, the velocity of the intermediate media (ground) can be calculated.

The apparatus employed for down-hole seismic exploration employ the vibration apparatus in a similar manner to that used in extracting stuck objects from oil wells. (See U.S. Pat. No. 4,574,888.) The greatest difference involves employing the accelerometer 50 at the position of contact of the bottom of the drill string 11 with the casing 13 or liner, namely the spear 12. The signal leads 91 from the accelerometer 50 may be led to the surface by wrapping them around the drill string 11 and enclosing them in slits 92 in the rubber drill pipe protectors 90. The accelerometer signal then becomes the controlled variable in the servo system, replacing the accelerometer at the junction plate 23.

An additional device may be employed to suppress the small amount of vibration transmitted from the reaction mass 21 of the device to the workover rig 17. This device is a spring 93 (FIG. 8) attached between the reaction mass 21 and the lifting block 19 of the workover rig 17. For the present configuration of the device a spring 93 with a spring constant of 5000 pounds per inch would attenuate the movement of the reaction mass 21 by an order of magnitude for the normal operating frequency of 10 to 500 hertz. The preferred construction for the spring 93 is a hydraulic cylinder connected to an accumulator 30. The charge pressure in the accumulator 30 may be varied to achieve the desired spring constant in the hydraulic cylinder 93.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A method for down-hole seismic exploration employing vibration emanating from a point deep in a well, comprising, attaching a spear to the lower end of the elastic steel column, the upper end of said column extending to the top of the well and thereabove, attaching said upper end of said column to a reaction mass vertically thereabove and isolated from earth, through vertically mounted compression spring means and, in parallel therewith, a vertically mounted servo-controlled hydraulic cylinder-piston assembly, sensing the displacement of said spear relative to the earth in which the wall is located and developing therefrom a displacement signal, reciprocating the piston in said hydraulic cylinder under servo control to apply vertical vibration to the upper end of said column and thereby to said spear, while developing an electrical, pressure-differential signal corresponding to the pressure across said cylinder-piston assembly, adjusting said vertical vibration through said servo control in accordance with said displacement signal and said pressure differential signal, to seek and find an appropriate resonant frequency for said column in the range of 5 Hz to 250 Hz, maintaining said frequency at resonance, thereby generating and transmitting a down-hole signal, detecting the signal at a location at a known distance from said spear and determining the time differential between transmission and detection of the signal.

2. The method of claim 1 wherein said step of maintaining said frequency at resonance includes keeping the displacement signal and pressure differential at a phase difference of approximately 90°.

3. A method for down-hole seismic exploration employing vibration emanating from a point deep in a well, comprising, attaching a spear to the lower end of an elastic steel column, the upper end of said column extending to the top of the well and thereabove, attaching said upper end of said column to a reaction mass vertically thereabove through vertically mounted compression spring means and, in parallel therewith, a vertically mounted servo-controlled hydraulic cylinder-piston assembly, sensing the displacement of said spear relative to the earth in which the wall is located, by an accelerometer connected to said upper end of said column, and developing therefrom a displacement signal, reciprocating the piston in said hydraulic cylinder under servo control to apply vertical vibration to the upper end of said column and thereby to said spear, while developing an electrical, pressure-differential signal corresponding to the pressure across said cylinder-piston assembly, adjusting said vertical vibration through said servo control in accordance with said displacement signal and said pressure differential signal, to seek and find an appropriate resonant frequency for said column in the range of 5 Hz to 250 Hz, maintaining said frequency at resonance, thereby generating and transmitting a down-hole signal, detecting the signal at a location at a known distance from said spear and determining the time differential between transmission and detection of the signal.

4. The method of claim 1 wherein said step of sensing the displacement is accomplished by an accelerometer located at said spear and sending its signal above ground to said adjusting step.

5. The method of claim 1 where said detecting is done above ground.

6. The method of claim 1 where said detecting is down in a second well.

7. The method of claim 1 wherein said spear is a drill bit.

8. The method of claim 1 wherein said spear is in contact with a well casing.

9. A method for down-hole seismic exploration employing vibration emanating from a point deep within a well, comprising, attaching a spear to the lower end of an elastic steel column, the upper end of said column extending to the top of the well and thereabove, attaching said upper end of said column through an accelerometer to a reaction mass vertically thereabove and isolated from earth, through vertically mounted compression spring means and, in parallel therewith, a vertically mounted servo-controlled hydraulic cylinder-piston assembly, reciprocating the piston in said hydraulic cylinder under servo control to apply vertical vibration to the upper end of said column, measuring the instantaneous acceleration of said spear with reference to the stationary walls of the well and developing an electrical acceleration signal thereby, electrically double-integrating the acceleration signal, filtering the doubly integrated signal to attenuate its low frequency noise, thereby giving a displacement signal, simultaneously detecting the instantaneous pressure across the hydraulic cylinder-piston assembly and developing an electrical pressure-difference signal therefrom, detecting the relative phase between said pressure difference signal and said displacement signal and generating an electrical signal proportional to the relative phase, being zero when the phase is 90°, which is the condition at resonance, electrically integrating the relative phase signal to produce a voltage control signal, and applying said voltage control signal to drive a voltage-controlled oscillator to cause the output of that oscillator to maintain said resonance, generating from said output at said spear a series of down-hole vibration signals, detecting said signals at a plurality of distant locations, at known distances from said spear, and determining the time differentials between transmission and detections of said signals.

10. A method for down-hole seismic exploration employing vibration emanating from a point deep in a well, comprising, attaching a spear to the lower end of an elastic steel column, the upper end of said column extending to the top of the well and thereabove, attaching said upper end of said column to a reaction mass vertically thereabove and isolated from earth, through vertically mounted compression spring means and, in parallel therewith, a vertically mounted servo-controlled hydraulic cylinder-piston assembly, sensing at said spear the displacement of said spear relative to the earth in which the wall is located and developing therefrom an amplitude signal, reciprocating the piston in said hydraulic cylinder under servo control to apply vertical vibration to the upper end of said column and thereby to said spear, while developing an electrical, pressure-differential signal corresponding to the pressure across said cylinder-piston assembly, adjusting said vertical vibration through said servo control in accordance with said amplitude signal and said pressure differential signal, to keep said amplitude signal constant while applying repeated sweeps of frequencies to said column in the range of about 5 Hz to 250 Hz, thereby generating and transmitting a down-hole signal, detecting the signal at a location at a known distance from said spear, and determining the time differential between transmission and detection of the signal.

11. A method for down-hole seismic exploration employing vibration emanating from a point deep in a well, comprising, attaching a spear to the lower end of an elastic steel column, the upper end of said column extending to the top of the well and thereabove, attaching said upper end of said column to a reaction mass vertically thereabove through vertically mounted compression spring means and, in parallel therewith, a vertically mounted servo-controlled hydraulic cylinder-piston assembly, sensing the displacement of said spear relative to the earth in which the wall is located, by an accelerometer connected to said upper end of said column, and developing therefrom an amplitude signal, reciprocating the piston in said hydraulic cylinder under servo control to apply vertical vibration to the upper end of said column and thereby to said spear, while developing an electrical, pressure-differential signal corresponding to the pressure across said cylinder-piston assembly, adjusting said vertical vibration through said servo control in accordance with said amplitude signal and said pressure differential signal, to keep said amplitude signal constant while applying repeated sweeps of frequencies to said column in the range of about 5 Hz to 250 Hz, thereby generating and transmitting a down-hole signal, detecting the signal at a location at a known distance from said spear, and determining the time differential between transmission and detection of the signal.

12. A method for down-hole seismic exploration employing vibration emanating from a point deep in a well, comprising, attaching a drill bit to the lower end of an elastic steel column, the upper end of said column extending to the top of the well and thereabove, attaching said upper end of said column to a reaction mass vertically thereabove through vertically mounted compression spring means and, in parallel therewith, a vertically mounted servo-controlled hydraulic cylinder-piston assembly, sensing means for sensing the displacement of said drill bit relative to the earth in which the wall is located and developing therefrom an amplitude signal, reciprocating the piston in said hydraulic cylinder under servo control to apply vertical vibration to the upper end of said column and thereby to said drill bit, while developing an electrical, pressure-differential signal corresponding to the pressure across said cylinder-piston assembly, adjusting said vertical vibration through said servo control in accordance with said amplitude signal and said pressure differential signal, to keep said amplitude signal constant while applying repeated sweeps of frequencies to said column in the range of about 5 Hz to 250 Hz, thereby generating and transmitting a down-hole signal, detecting the signal at a location at a known distance from said drill bit, and determining the time differential between transmission and detection of the signal.

13. A method for down-hole seismic exploration employing vibration emanating from a point deep within a well, comprising, attaching a spear to the lower end of an elastic steel column, the upper end of said column extending to the top of the well and thereabove, attaching said upper end of said column through an accelerometer to a reaction mass vertically thereabove and isolated from earth, through vertically mounted compression spring means and, in parallel therewith, a vertically mounted servo-controlled hydraulic cylinder-piston assembly, reciprocating the piston in said hydraulic cylinder under servo control to apply vertical vibration to the upper end of said column, measuring at said spear the instantaneous acceleration of said spear with reference to the stationary walls of the well and developing an electrical amplitude signal thereby, comparing said amplitude signal with a reference amplitude and producing a constant amplitude signal therefrom, electrically integrating the relative phase signal to produce a voltage control signal, driving a voltage-controlled oscillator to cause the output of that oscillator to sweep repeatedly from about 5 hertz to about 250 hertz, while applying to said oscillator said constant amplitude signal, generating from said output at said spear a series of down-hole vibration signals that sweep the said frequencies at constant amplitude, detecting said signals at a plurality of distant locations, at known distances from said spear, and determining the time differentials between transmission and detection of said signals.

14. Apparatus for down-hole seismic exploration employing vibration signals generated deep in a well, comprising an elastic steel column extending from above the top of the well down into it and having a spear at its lower end, a reaction mass vertically above said column, and isolated from earth, vertically mounted compression spring means and, in parallel therewith, a vertically mounted hydraulic cylinder-piston assembly connecting said reaction mass to said column, sensing means for sensing the displacement of said spear relative to the earth in which the well is located, and for generating a displacement signal therefrom, servo-control means connected to said hydraulic cylinder-piston assembly for reciprocating the piston of said assembly under servo control to apply vertical vibration to the spear, and feedback means connected to said sensing means and to said servo-control means and employing the phase difference between a displacement signal from said sensing means and a pressure difference signal from said cylinder-piston assembly for adjusting said servo control to cause said assembly to seek and maintain an appropriate resonant frequency for said column in the range of 5 Hz to 250 Hz.

15. The apparatus of claim 14 wherein said feedback means includes means for maintaining a phase difference of approximately 90° between said displacement signal and said pressure difference signal.

16. Apparatus for down-hole seismic exploration employing vibration signals generated deep in a well, comprising an elastic steel column extending from above the top of the well down into it and having a spear at its lower end, a reaction mass vertically above said column, vertically mounted compression spring means and, in parallel therewith, a vertically mounted hydraulic cylinder-piston assembly connecting said reaction mass to said column, sensing means comprising an accelerometer connected to the upper end of said column for sensing the displacement of said spear relative to the earth in which the well is located, and for generating a displacement signal therefrom, servo-control means connected to said hydraulic cylinder-piston assembly for reciprocating the piston of said assembly under servo control to apply vertical vibration to the spear, and feedback means connected to said sensing means and to said servo-control means and employing the phase difference between a displacement signal from said sensing means and a pressure difference signal from said cylinder-piston assembly for adjusting said servo control to cause said assembly to seek and maintain an appropriate resonant frequency for said column in the range of 5 Hz to 250 Hz.

17. The apparatus of claim 14 wherein said feedback means comprises a double integrator electrically connected to said accelerometer to develop a displacement signal, a pressure-differential transducer connected to the opposite sides of said piston and delivering a pressure-difference signal, and resonant controller means for receiving said displacement signal and said pressure-difference signal and for controlling frequency of delivery of pressurized fluid from said servo control means to said hydraulic-piston assembly on each side of said piston such as to maintain a phase difference of approximately 90° between the two said signals.

18. The apparatus of claim 14 having an accumulator secured to said reaction mass and connected hydraulically to said piston-cylinder assembly, a source of high pressure gas, and means for delivery, when desired, a pulse of high pressure gas from said source to said accumulator.

19. Apparatus for generating signals for down-hole seismic exploration from deep in a well, comprising an elastic steel column in said well having its upper end extending to the top of the well and thereabove, and a spear on its lower end, comprising a reaction mass vertically above said column and isolated from earth, vertically mounted compression spring means and, in parallel therewith, a vertically mounted hydraulic cylinder-piston assembly connecting said reaction mass to said column through an accelerometer, servo-control means connected to said hydraulic cylinder-piston assembly for reciprocating the piston of said assembly under servo control to apply vertical vibration to said spear, and feedback means connected to said accelerometer and to said servo-control means and including measuring means for measuring the acceleration of said spear with reference to the stationary walls of the well, first signal generating means for developing an electrical acceleration signal corresponding to said acceleration, double integrator means for electrically double-integrating the acceleration signal, filter means to filtering the doubly integrated signal to attenuate its low frequency noise, thereby giving a displacement signal, pressure sensing means for detecting the pressure across the hydraulic cylinder-piston assembly, second signal generating means for developing an electrical, pressure-difference signal from said pressure, detecting means for detecting the relative phase between said pressure difference signal and said displacement signal, third signal generating means for generating an electrical signal proportional to the relative phase, said signal being zero when the phase is 90° which is the condition at resonance, single integrating means for electrically integrating the relative phase signal to produce a voltage control signal, and driving means for applying said voltage control signal to drive a voltage-controlled oscillator to cause the output of that oscillator to maintain said resonance at an appropriate resonant frequency for said column in the range of 5 Hz to 250 Hz.

20. Apparatus for down-hole seismic exploration employing vibration signals generated deep in a well, comprising an elastic steel column extending from above the top of the well down into it and having a spear at its lower end, a reaction mass vertically above said column and isolated from earth, vertically mounted compression spring means and, in parallel therewith, a vertically mounted hydraulic cylinder-piston assembly connecting said reaction mass to said column, sensing means attached to said spear for sensing the displacement of said spear relative to the earth in which the well is located, and for generating an amplitude signal therefrom, detecting means for detecting said amplitude signal, comparing means for comparing said detected amplitude signal with a reference amplitude signal and modifying said detected amplitude signal to give a constant value signal, servo-control means connected to said hydraulic cylinder-piston assembly for reciprocating the piston of said assembly under servo control to apply vertical vibration to the spear, ramp generator means for generating a repeating sweep of frequencies from about 5 Hz to 250 Hz, and combining means for combining said sweep repeating signal with such constant value signal for adjusting said servo control to cause said assembly to vibrate at constant amplitude over and sweep frequency range.

21. Apparatus for down-hole seismic exploration employing vibration signals generated deep in a well, comprising an elastic steel column extending from above the top of the well down into it and having a spear at its lower end, a reaction mass vertically above said column, vertically mounted compression spring means and, in parallel therewith, a vertically mounted hydraulic cylinder-piston assembly connecting said reaction mass to said column, sensing means comprising an accelerometer connected to the upper end of said column for sensing the displacement of said spear relative to the earth in which the well is located, and for generating an amplitude signal therefrom, means for detecting said amplitude signal, means for comparing said detected amplitude signal with a reference amplitude signal and modifying said detected amplitude signal to give a constant value signal, servo-control means connected to said hydraulic cylinder-piston assembly for reciprocating the piston of said assembly under servo control to apply vertical vibration to the spear, ramp generator means for generating a repeating sweep of frequencies from about 5 Hz to 250 Hz, and means for combining said sweep repeating signal with such constant value signal for adjusting said servo control to cause said assembly to vibrate at constant amplitude over and sweep frequency range.

22. The apparatus of claim 20 having an accumulator secured to said reaction mass and connected hydraulically to said piston-cylinder assembly, a source of high pressure gas, and means for delivery, when desired, a pulse of high pressure gas from said source to said accumulator.

* * * * *